INSPECTION SYSTEM

Filed Dec. 30, 1948 2 Sheets-Sheet 1

INVENTOR
Alfred N. Goldsmith
BY Morris A. Rabkin
ATTORNEY

Aug. 11, 1953 A. N. GOLDSMITH 2,648,723

INSPECTION SYSTEM

Filed Dec. 30, 1948 2 Sheets-Sheet 2

INVENTOR
Alfred N. Goldsmith
BY Morris A. Rabkin
ATTORNEY

Patented Aug. 11, 1953 2,648,723

UNITED STATES PATENT OFFICE

2,648,723

INSPECTION SYSTEM

Alfred N. Goldsmith, New York, N. Y., assignor to Radio Corporation of America, New York, N. Y., a corporation of Delaware

Application December 30, 1948, Serial No. 68,115

12 Claims. (Cl. 178—6.8)

1

Figure 1:
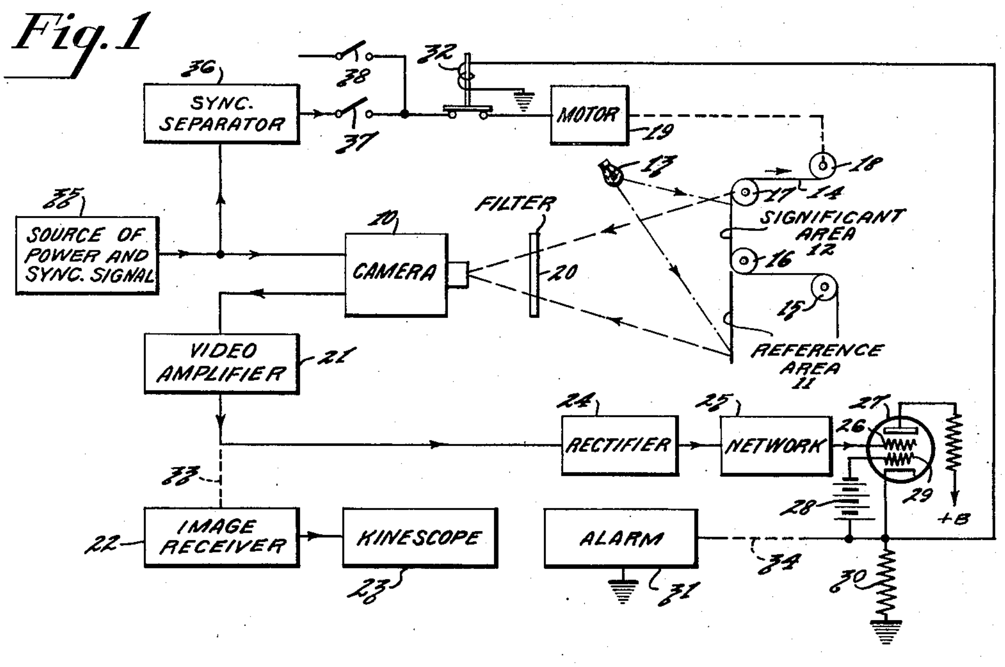

This invention relates to inspection systems such as are operable to produce an indicating or control effect, or both, in response to (1) the rate of change in the emission of light or other energy radiated from an inspected area or (2) change in the relation between the substantially constant radiation of a reference area and that of a significant area which is under inspection.

In one modification of the invention, these results are achieved by means including a television camera which functions to scan the significant and reference areas and to produce a video output current which changes in value only when the relation between energy radiated from the two surfaces changes or becomes abnormal. Such change in video current is utilized to provide an indication, to control a motor or other motive means by which the material within, upon, or forming significant area is moved, or to produce other desired or related effects as may be desired.

The significant area may be a stationary surface or a section of a band, thread or other object which is moved through the field of view of the camera. The information desired with respect to the inspected object may involve its dimensions, its color, its texture, its continuity, its temperature and corresponding energy radiation or absorption, or some other characteristic capable of registering an effect on the mosaic of the television camera.

In a second modification of the invention, there is provided (1) an additional element which is sensitive only to the energy radiated from the reference area and (2) a differential relay or a ratio relay which is made responsive respectively to the differences or the ratios of the video currents of the television camera and this additional element for producing the effects indicated above. As will appear such additional element may be a television camera or a photoelectric cell or other radiation-sensitive device. It is apparent that the television camera is preferred where relatively large areas are involved.

Under some conditions of operation, it is desirable to provide shielding means whereby the radiation from each such area is isolated from that of the other. In further modifications of the invention such isolation is effected by means of a shield interposed between the two areas or by a pair of kinescopes, one of which is optically or otherwise masked so as to display only an image of the significant area and the other of which is masked so as to display only an image of the reference area. Where two kinescopes are utilized to produce separate images of the significant and reference areas, these images function (1) to permit visual inspection of the two surfaces and (2) to energize separate photoelectric cells or other energy-responsive devices through which the differential relay or ratio relay, previously mentioned, is energized in response to an abnormal relation between the energies radiated from the two areas.

2

A further feature of the invention is the provision of means, located at a point remote from the significant and reference areas, whereby images of the two areas may be viewed and whereby an alarm is made to call attention to these images when an abnormal relation occurs between the energies radiated from the two areas.

The principal object of the invention is the provision of an improved inspection system and method of operation whereby an indication or a control effect is produced in response to the occurrence of an abnormal relation between the energy radiated from a reference area and that radiated from a significant or inspected area. Further objects of the invention are (1) the provision of means which make available at a remote point images of the significant and reference areas and (2) which also function to call attention to these images in response to an abnormal relation between the energies radiated from the two areas and (3) the provision of an improved inspection system which is operable to detect changes in the relation between luminosities of two areas irrespective of any normal variation in the brightness over the entire field of such areas.

In the following description of the invention, emphasis is placed on an inspection system wherein the energy radiated from the significant and reference areas is in such form as to be visible. It should be understood, however, that such radiated energy may be of frequencies, or wavelengths, lying outside the visible range provided the filters and lens systems are so designed as to pass only such frequency or wavelength bands and the photo-electric cells and camera mosaics are made sensitive to such spectral regions. The techniques involved in changes of this nature are well known and need not be described in great detail. Since these changes involve no departure from the basic features of the present invention, they are considered to be within its scope. Some of them are specifically claimed in copending applications filed concurrently herewith.

The invention will be better understood from the following description considered in connection with the accompanying drawings, and its scope is indicated by the appended claims.

Figure 2:
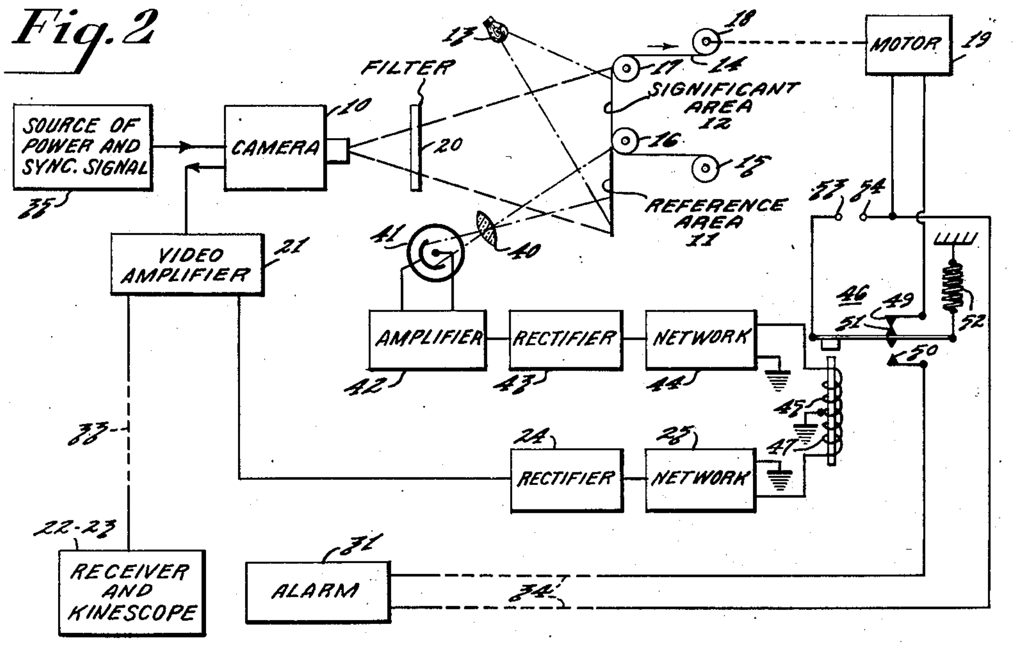
Figure 3:
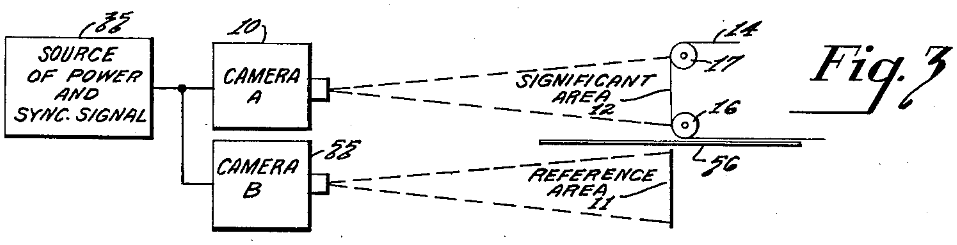
Figure 4:
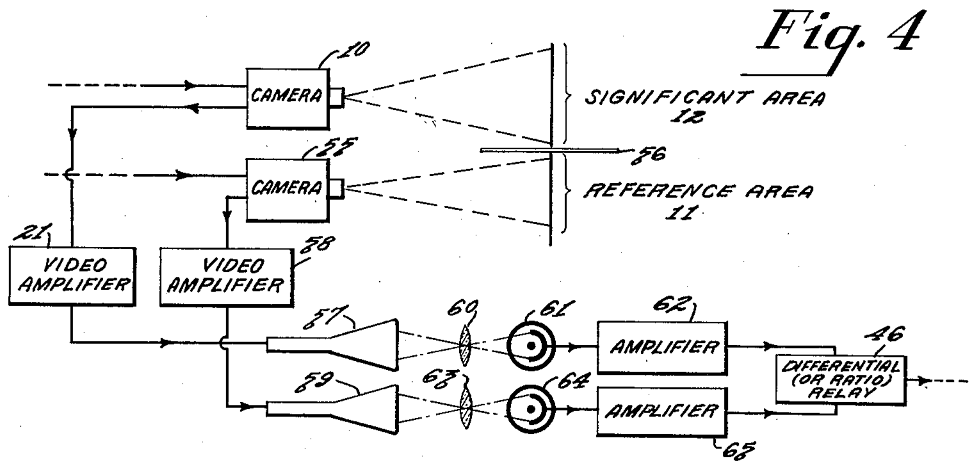

Referring to the accompanying drawings:

Figure 1 is for the most part a block diagram indicating the relation between the various parts of the system, the electrical connections being generally indicated by single lines bearing arrow heads which indicate the direction of current flow, Figure 2 is similar to Figure 1 in many respects but differs therefrom in that it includes a differential relay or ratio relay having one winding energized in accordance with radiation from the significant area and another winding energized in accordance with radiation from the reference area, Figure 3 is a fragmentary view illustrating a modification of the system of Figure 2, the main modification being that radiation from the reference area is received by a television camera instead of a photoelectric cell, Figure 4 illustrates a modified inspection system wherein the relay is energized from a pair of photoelectric cells which are exposed respectively to an image of the reference area and to an image of the significant area.

Figure 5:
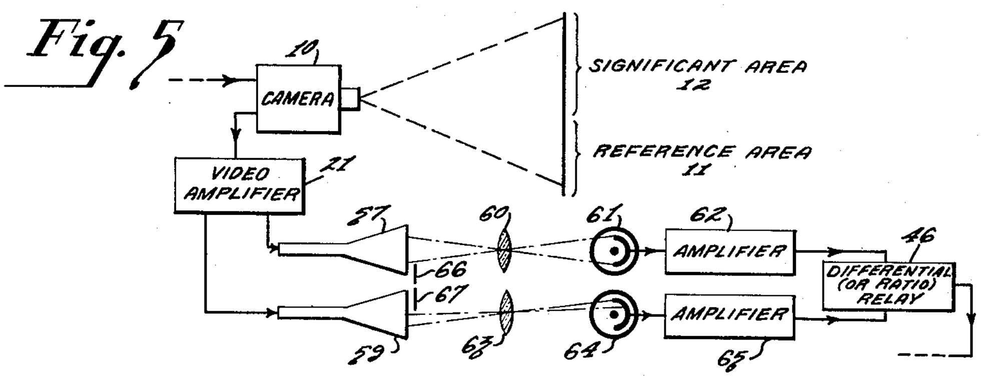
Figure 6:
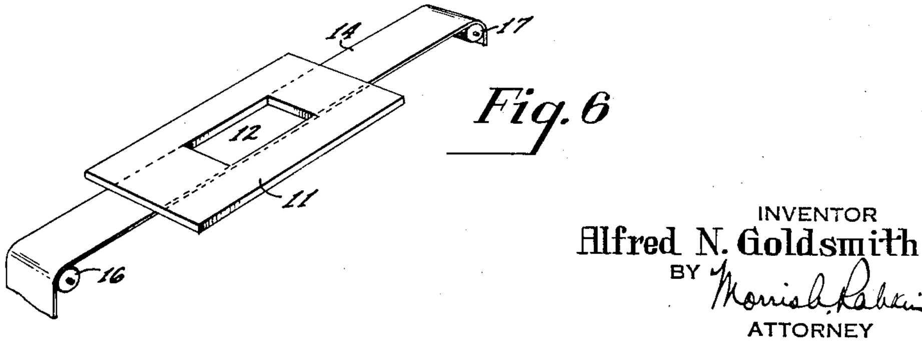

Figure 5 is similar to Figure 4 with the exception that the images of the two areas are separated by means of masks at the kinescopes instead of a mask placed between the areas, and Figure 6 illustrates a modification wherein the significant area is observed through an aperture in the reference area. While this aperture is shown in the form of a rectangle, it is contemplated that its form is to be determined by the shape or nature of the object to be inspected.

The system of Figure 1 includes a television camera 10 which may be of any suitable type such as that illustrated on page 383 of "Electronics Dictionary" by Cooke and Markus, published by McGraw-Hill Book Company, Inc., New York, first edition. As is well known this camera has associated with it video amplifier, limiter, and pulse generator circuits like or equivalent to those indicated on page 425 of "Elements of Radio" by Terman, published by the above publisher, 1938 edition.

Exposed to the field of view of the camera 10 are a reference area 11 and a significant area 12. Depending, for example, on the character of the material to be inspected in the significant area 12, the two areas may be illuminated from a source 13 or by means of light transmitted through them. Under some conditions of operation the reference area may be a standard source of radiation and the significant area may be another source of radiation which is to be compared with the standard source. In the modification of Figure 1, these two areas are shown as flat surfaces, the significant area being an exposed section of a strip or band 14 arranged to be drawn by a motor 19 from a feed reel 15 over idlers 16 and 17 to a take-up reel 18. It should, however, be understood that these two areas may alternatively be non-planar and of any desired three-dimensional character.

Energy radiated from the surfaces 11 and 12 passes through a filter 20 to the lens system of the camera and thence to its light-sensitive mosaic. The resulting video output current is delivered to a video amplifier 21. Output from the amplifier 21 is delivered (1) to an image receiver 22 and a kinescope 23 and (2) through a rectifier 24 and a network 25 to a grid 26 of a tube 27.

The network 25 may be of the differentiating type or the integrating type depending illustratively on whether the significant area is to be inspected for rapid or slow changes in its radiated energy. In any case, it is made to have such a time constant that only significant amplitude-changing and sufficiently prolonged changes of brightness within the field of view of the camera produce sufficient voltage at the grid 26 materially to alter the conductivity of the tube 27.

It will be noted that the tube 27 is normally biased substantially to cutoff by a negative potential applied from a battery 28 to its first grid 29. When the grid 26 is made sufficiently positive, however, the tube 27 conducts, current is drawn through a cathode lead resistor 30, and an alarm 31 and a relay 32 are energized.

As indicated by broken lines 33 and 34, it is contemplated that the kinescope 23 and the alarm 31 be located at an inspection point more or less remote from the remainder of the system. This arrangement has the advantage that an image of the field of view is always conveniently available for inspection, and attention is immediately called to this image in response to the occurrence of an abnormal relation between the energies radiated from the two areas.

When it is desired to maintain some predetermined relation between movement of the inspected article 14 and the scanning of its exposed area, the motor 19 may be energized from the same source 35 as the camera 10 through a synchronizing signal separator 36, a switch 37, and the relay 32. If no such predetermined relation is desired, the motor 19 may be otherwise energized through means including a switch 38. In either case, it is usually desirable that the movement of the article 14 be sufficiently slow to permit scanning of its complete area during each field scanning.

The relay 32 functions to deenergize the motor 19 and to stop movement of the inspected article 14.

The invention is applicable to many cases where the significant area is stationary. Examples of these are protective systems where it is desired to detect a shadow or dimming, a fire or brightening, or other change in the radiation from a fixed area.

In any case, the constants of the network 25 are made such that the tube 27 draws a substantial amount of current only in response to some definitely abnormal condition which is to be detected in the significant area. For example, if rapid changes are to be detected, a differentiating network of the type wherein a series capacitor is followed by a shunt resistance will be often found satisfactory. In other cases the network may be an integrating circuit, a high pass filter, or a low pass filter depending on the characteristic to be detected in the significant area. In the cases where the network is to have an integrating or differentiating function, the network circuitry may take any of the forms shown and described in Terman, "Radio Engineering," 3rd edition, 1947, on pages 599 and 600. A description of high pass and low pass filters that may be used in the network appears on pages 141 and 142 of Henney's "The Radio Engineering Handbook," 1st edition, 1933. Since circuits to perform these functions are well known in the art, this invention should not be considered as limited to the particular circuits described above.

Figure 2 illustrates an inspection system which is similar to that of Figure 1 in several respects. Insofar as the two systems are similar, the same reference numerals are applied to corresponding parts.

In the system of Figure 2, the energy radiated from the reference area 11 is passed through a lens 40 to a photoelectric cell 41. The output current of the cell 41 is amplified by an amplifier 42, rectified by a rectifier 43, and passed to a network 44 and thence to the coil 45 of the relay 46. Output from the network 25, which resembles the previously described network 25, is delivered to the other coil 47 of the relay 46.

The relay 46 is provided with a pair of fixed contacts 49 and 50, and with a movable contact 51 which is movable to engage either of the fixed contacts 49 and 50 and is biased to engage the contact 49 by means of a spring 52.

Power for energizing the motor 19 which drives the takeup reel 18 is derived from a source (not shown) through terminals 53 and 54. The terminal 53 is connected to the movable contact 51. The terminal 54 is connected to the motor 19 and to the alarm 31. With the contacts 49 and 51 engaged, the motor 19 is connected between the terminals 53 and 54. When the contact 51 engages the contact 50 the motor is deenergized and the alarm 31 is energized. Movement of the contact 51 from the contact 49 to the contact 50 is effected in response to some predetermined relation between the energies radiated from the areas 11 and 12.

The networks 25 and 44 are not necessarily identical in their time constants but may be selected as desired to differentiate between any normal and nonsignificant changes in the radiated energy of the reference are a and any abnormal and significant changes in the radiated energy of the inspected or significant area. Depending on the character of the significant area, the networks are made to have constants such that the torques exerted through the coils 45 and 47 are balanced one against the other so long as conditions in the significant area are normal. Upon departure from such normal conditions, the torques are unbalanced in a manner to move the contact 51 from the contact 49 to the contact 50 with the results previously indicated.

The modification of Figure 3 is like that of Figure 2 with the exception that the photo-electric cell 41 is replaced by a television camera 55 and a shield 56 is arranged to isolate the energies radiated from the significant and reference areas.

The modification of Figure 4 differs from that of Figure 3 in that the video current output of the camera 10 is supplied through the amplifier 21 to a kinescope 57 and the similar output of the camera 55 is supplied through the amplifier 58 to a kinescope 59. In connection with the kinescopes 57 and 59, it is to be understood that they include such circuits (not shown) as are usually associated with devices of this type. One example of such circuits is to be found on page 425 of "Fundamentals of Radio" by Terman, identified above. It is also to be understood that the images on the kinescopes 57 and 59 are preferably visible for observation.

It is considered that the kinescopes be located at an inspection point more or less remote from the cameras 10 and 55. The images of the two areas are thus made available for visual examination at the inspection point.

The images produced on the screens of the kinescopes 57 and 59 are also utilized to control the energization of the relay 46. To this end, the image of the kinescope 57 is projected through a lens 60 to a photoelectric cell 61, the output of which is amplified by an amplifier 62 and supplied to one winding of the relay 46. Similarly, the image of the kinescope 59 is projected through a lens 63 to a photoelectric cell 64, the output of which is amplified by an amplifier 65 and supplied to the other winding of the relay 46. As previously indicated, the relay 46 may function to energize an alarm, to start or stop a motor, or to produce other desired effects.

The modification of Figure 5 is like that of Figure 4 with the exception that the shield 56 of Figure 4 is omitted and in its stead are provided shields 66 and 67 arranged to selectively mask, discriminate between, or separate the images of the two areas so that only the image of the significant area is passed to one of the cells and only the image of reference area is passed to the other of the cells.

As indicated by Figure 6, the significant area may be in the form of a strip of material which is being inspected for uniformity in width. In this case, a normal relation exists between the energies radiated from the significant and reference areas only so long as the width of the strip is uniform and an alarm or control effect is produced upon change in the width of the strip. The inspected article may be of various other forms such as a thread, a succession of separate objects, a moving part of a machine, a fabric which is desired to have a predetermined brightness characteristic or color pattern or surface structure or texture, a metal object which is to be maintained at a predetermined normal temperature or the like. In each case, the significant area is made of a form calculated to derive the desired information.

In cases of the type where a moving part of a machine or a succession of separate objects are to be inspected, the video current output may have a frequency component which (1) is constant or within a tolerable and acceptable range of frequencies so long as there is a normal relation between the energies radiated from the significant reference areas but (2) changes in response to an abnormal relation. Also the reference and significant areas may have radiation characteristics such that a predetermined relation is maintained between different component frequencies only under normal conditions. In cases of this character, the networks 25 and 44 may be filters designed to distinguish between the normal frequency components and the abnormal frequency components which are to actuate the relay for producing an alarm or other control effect. Filters of this type that may be used are shown in Henney's "The Radio Engineering Handbook," 1st edition, 1933, on pages 142, 143, and 144.

While the relay 26 is illustrated as of the differential type, it may be a ratio relay of the type disclosed in my U. S. Patent No. 2,134,757.

What the invention provides is an improved inspection system which is capable of covering relatively large areas or any portions thereof and is operable to permit inspection at a remote point under normal conditions of the inspected area and to sound an alarm or produce a control effect when such condition becomes abnormal.

What is claimed is:

1. The combination of means providing a reference area having a predetermined energy radiation characteristic and a significant area having an energy radiating characteristic which normally bears a specific ratio relation to said predetermined characteristic, means including at least one television camera arranged to produce an alternating current which changes in response to change in said relation, a wave selective network responsive to the rate of said change in said current for producing a potential dependent on a predetermined departure from said relation, and means responsive to said potential for indicating said departure.

2. The combination of means providing a reference area having a predetermined energy radiation characteristic and a significant area having an energy radiating characteristic which normally bears a specific ratio relation to said predetermined characteristic, means including at least one television camera arranged to produce an alternating current which changes in response to change in said relation, means responsive to said current for producing an image of said areas at an inspection point remote from said areas, and a wave selective network responsive to the rate of said change in said current for actuating an alarm at said inspection point.

3. The combination of a television camera, a reference area of predetermined brightness, a significant area of a brightness which normally bears a specific ratio relation to said predetermined brightness, said camera being arranged to view both said areas, a wave selective network responsive to the rate of change of the video current output of said camera for producing a potential dependent on a predetermined departure from said relation, and means responsive to said potential for providing an indication of said departure.

4. The combination of a television camera, a reference area of predetermined brightness, a significant area of a brightness which normally bears a specific ratio relation to said predetermined brightness, said camera being arranged to view both said areas simultaneously, a wave selective network responsive to the rate of change of the video current output of said camera for producing a potential dependent on a predetermined departure from said relation, means responsive to said potential for providing an indication of said departure, and means responsive to said current for producing an image of said areas at an inspection point remote from said areas.

5. The combination of a television camera, a reference area of predetermined brightness, a significant area of a brightness which normally bears a specific ratio relation to said predetermined brightness, said camera being arranged to view both said areas, means including a network responsive to the rate of change of the output current of said camera and having constants such as to produce a predetermined potential only in response to a predetermined departure from said relation, and means responsive to said potential for indicating said departure.

6. The combination of a television camera, a significant area of predetermined brightness, an adjacent reference area, said significant area normally bearing a specific ratio relation to the predetermined brightness of said adjacent reference area, said television camera being arranged to view both said areas simultaneously, a photoelectric element arranged to receive only energy radiated from said reference area, and means responsive respectively to the video current outputs of said camera and said photoelectric element for producing a potential dependent upon ratio differences of said outputs.

7. The combination of a pair of television cameras, a reference area of predetermined energy radiation characteristic, a significant area of an energy radiation characteristic which normally bears a specific ratio relation to said predetermined characteristic, each of said cameras being arranged to view a respective one of said areas, and wave selective networks responsive respectively to the video current outputs of said cameras for producing a potential dependent on a predetermined departure from said specific relation.

8. The combination of a pair of television cameras, a reference area of predetermined energy radiation characteristic, a significant area of an energy radiation characteristic which normally bears a constant ratio relation to said predetermined characteristic, each of said cameras being arranged to view a respective one of said areas, and a wave selective network responsive respectively to the video current outputs of said camera for producing a potential dependent on the rate of change from said relation.

9. The combination of a pair of television cameras, a reference area of predetermined energy radiation characteristic and a significant area of an energy radiation characteristic which normally bears a specific ratio relation to said predetermined characteristic, each of said cameras being arranged to view a respective one of said areas and means responsive respectively to the video current outputs of said camera for producing a potential dependent on change from said relation in the component frequencies of the video output current of the one of said cameras arranged to view said significant area.

10. The combination of a pair of television cameras, a stationary reference area of predetermined energy radiation characteristic, a moving significant area of an energy radiation characteristic which normally bears a specific ratio relation to said predetermined characteristic, each of said cameras being arranged to view a respective one of said areas, means responsive respectively to the rate of change of the video current outputs of said cameras for producing a potential dependent on departure from said specific relation, and means responsive to said potential for controlling said movement of said significant area.

11. The combination of a television camera, a stationary reference area having a predetermined energy radiating characteristic, a moving significant area having an energy radiating characteristic which normally bears a specific ratio relation to said predetermined characteristic, said camera being arranged to view said areas, a wave selective network responsive to the rate of change of the video current output of said camera for producing a potential dependent on departure from said relation, and means responsive to said potential for controlling the movement of said significant area.

12. The combination of a television camera, a stationary reference area having a predetermined energy radiating characteristic, a moving significant area having an energy radiating characteristic which normally bears a specific ratio relation to said predetermined characteristic, said camera being arranged to view both said areas, means responsive to the rate of change of the video current output of said camera for producing a potential dependent on departure from said relation, means responsive to said potential for controlling the movement of said significant area, means responsive to said current for producing an image of said areas at an inspection point remote from said areas, and means responsive to said potential for energizing at said point an alarm whereby attention is called to said image.

ALFRED N. GOLDSMITH.

References Cited in the file of this patent

UNITED STATES PATENTS

| Number | Name | Date |
|---|---|---|
| 1,987,441 | Hardy | Jan. 8, 1935 |
| 2,073,370 | Goldsmith | Mar. 9, 1937 |
| 2,134,757 | Goldsmith | Nov. 1, 1938 |
| 2,183,606 | Day | Dec. 19, 1939 |
| 2,240,722 | Snow | May 6, 1941 |
| 2,244,826 | Cox | June 10, 1941 |
| 2,247,684 | Hickok | July 1, 1941 |
| 2,262,942 | Jones | Nov. 18, 1941 |
| 2,307,728 | Mertz | Jan. 5, 1943 |
| 2,324,270 | Schlesman | July 13, 1943 |
| 2,339,754 | Brace | Jan. 25, 1944 |
| 2,403,975 | Graham | July 16, 1946 |
| 2,446,628 | Brown | Aug. 10, 1948 |
| 2,454,651 | Homrighous | Nov. 23, 1948 |
| 2,458,649 | Schade | Jan. 11, 1949 |
| 2,488,430 | Offner | Nov. 15, 1949 |